July 14, 1936.  C. E. EVERETT  2,047,410
ENSILAGE CUTTER
Filed Nov. 9, 1933    3 Sheets-Sheet 1

INVENTOR.
Charles E Everett
BY
A S Kroh
ATTORNEY

July 14, 1936.    C. E. EVERETT    2,047,410
ENSILAGE CUTTER
Filed Nov. 9, 1933    3 Sheets-Sheet 2
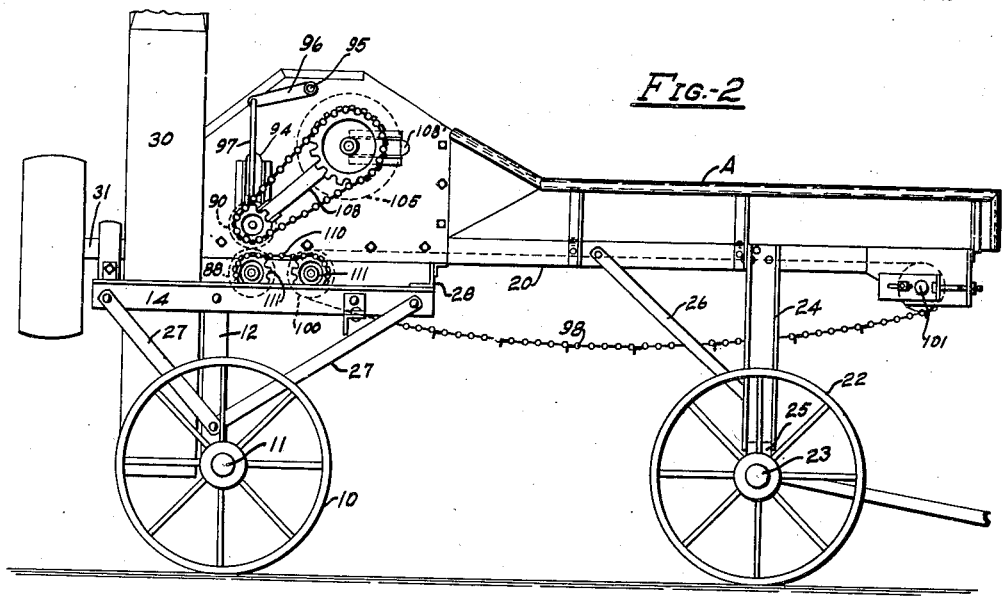
Fig.-2
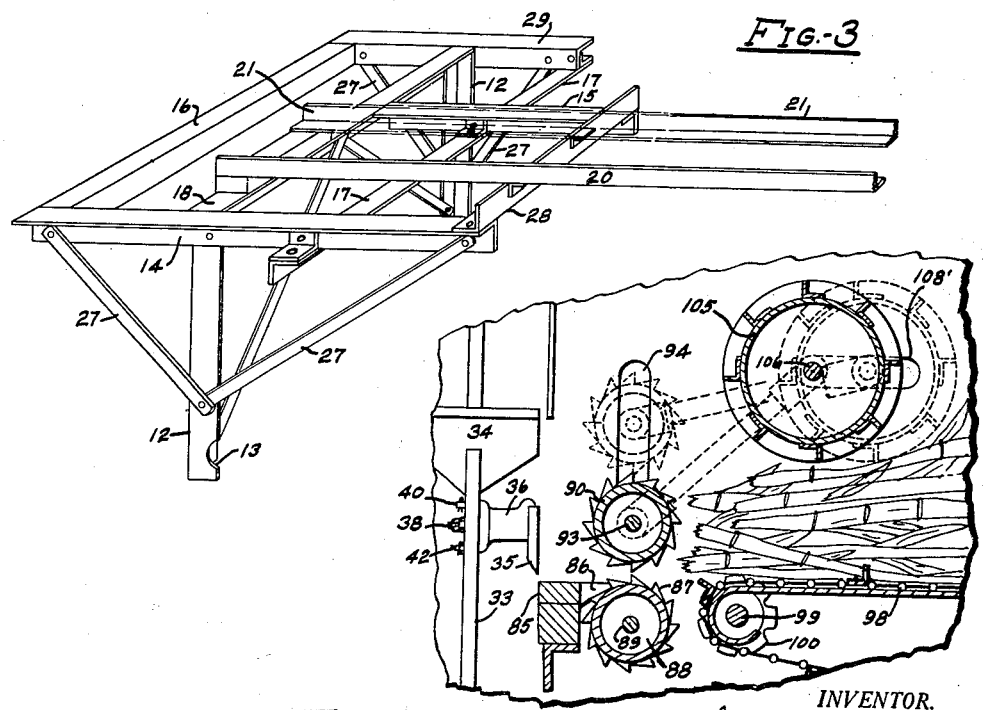
Fig.-3
Fig.-4
INVENTOR.
Charles E Everett
BY
ATTORNEY July 14, 1936.  C. E. EVERETT  2,047,410
ENSILAGE CUTTER
Filed Nov. 9, 1933  3 Sheets-Sheet 3
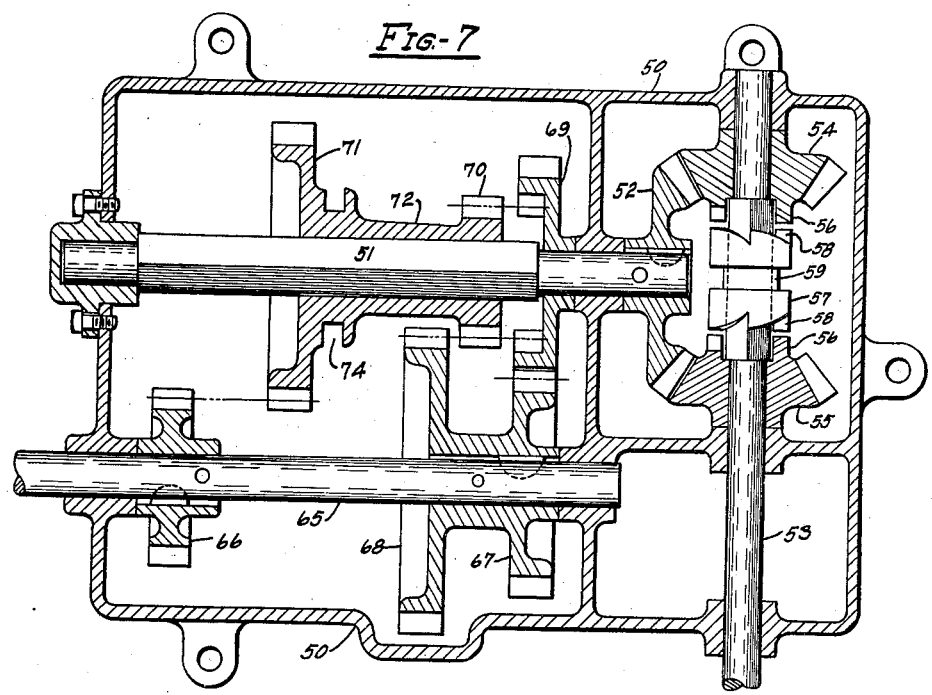
INVENTOR.
Charles E Everett
BY
A S Knob
ATTORNEY Patented July 14, 1936

2,047,410

UNITED STATES PATENT OFFICE 2,047,410

ENSILAGE CUTTER

Charles E. Everett, Racine, Wis., assignor to The Massey-Harris Company, Racine, Wis., a corporation of Maryland Application November 9, 1933, Serial No. 697,253

3 Claims. (Cl. 146—109)

It is the intention that the present patent shall cover by suitable expression in the appended claims, features other than claimed in my co-pending application, Serial No. 84,160, filed June 8, 1936.

Generally stated the invention relates to ensilage cutters wherein the stalks or other materials are fed into two feed rolls by means of an endless apron and wherein a supplemental feed roll is positioned a short distance from the feed rolls and over the endless apron, and having means whereby this supplemental roll will, under certain conditions, lift the upper feed roll to thereby prevent some of the stalks or other material from passing over the top thereof.

The invention also resides in a simple and novel gear driving mechanism, whereby the feeding device may be conveniently stopped, reversed, or the speed relative to the speed of the cutting knives, easily changed, by simply manipulating a gear shift somewhat similar to automobile gears.

The invention further resides in a novel knife supporting and adjusting means and a novel, simple and strong frame structure for the entire mechanism.

The principal object of my invention is to supply an ensilage cutter which is simple, strong, easily handled and not subject to frequent breakdowns or clogging.

To these and other useful ends, my invention resides in features of construction, the parts and combinations thereof, and mode of operation, or their equivalents, as hereinafter set forth and claimed and shown in the accompanying drawings in which:

Figure 2 is a side elevation of my ensilage cutter as shown in Figure 1.

Figure 3 is a perspective fractional view of the frame structure.

Figure 4 is an enlarged fractional section taken on line 4 of Figure 1, illustrating the feed rolls and other parts relative thereto.

Figure 5 is an enlarged fractional plan view of the knife supporting brackets, showing part of the carrying disk.

Figure 6 is a fractional end view of the knife supporting bracket, and a fraction of the disk in section.

Figure 7 is an enlarged section of the gears and their housing.

Figure 8 is a section taken on line 8 of Figure 1.

Figure 9 is an enlarged fractional section taken on line 8 of Figure 1.

Figure 10 is a fractional detail taken on line 10 of Figure 9.

Figure 1:
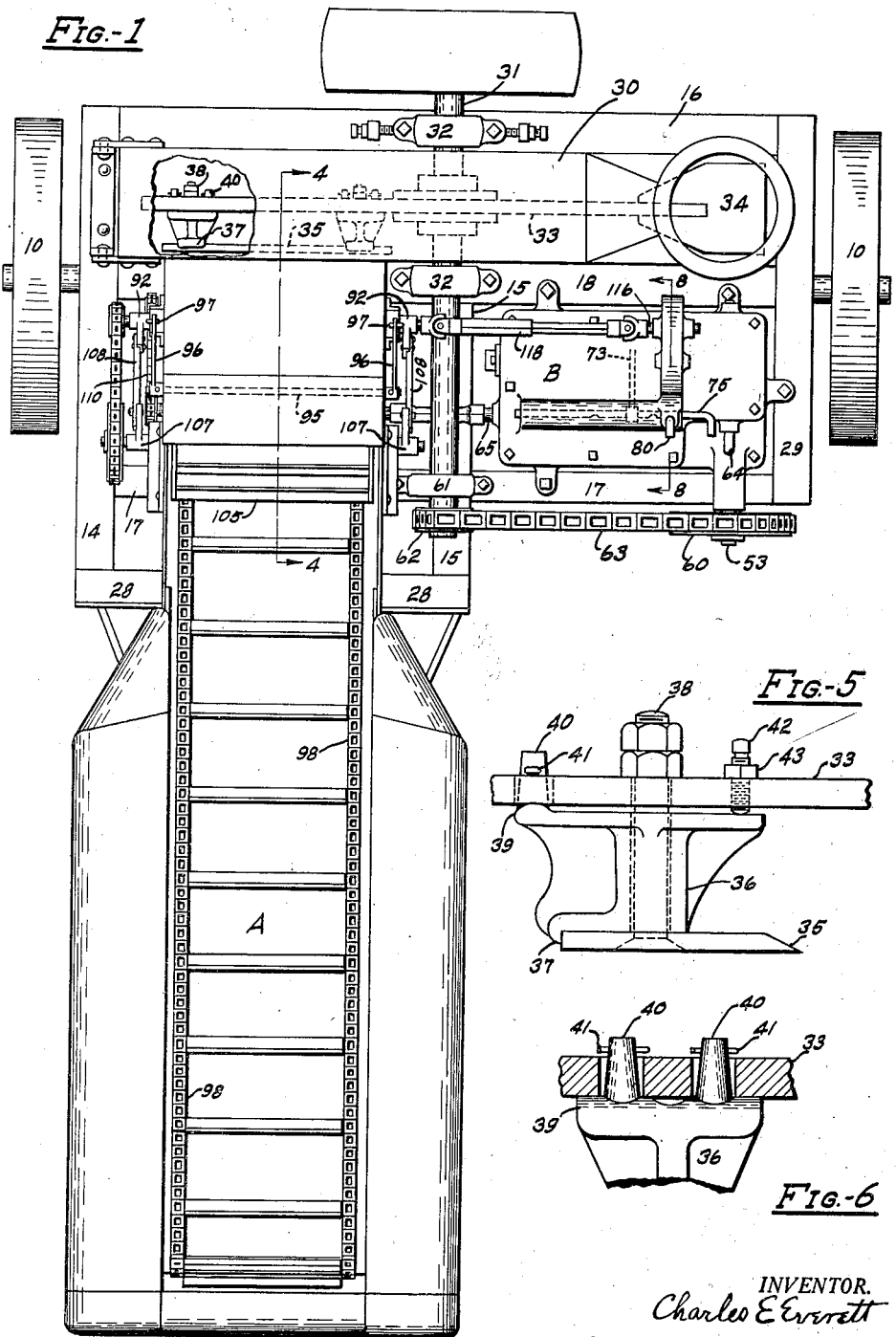
Figure 1 is a top plan view of my improved ensilage cutter.

As thus illustrated the frame structure comprises carrying wheels 10—10 which are mounted on axle 11, and to which the standards 12—12 are attached as at 13. Standards 12 are suitably attached to main frame side bars 14 and 29. Front and rear cross bars 16 and 17, are provided. A middle cross bar 18 is also provided.

Two rearwardly extending bars 20 and 21 form a frame structure for the front carrying wheels and for the receiving trough which in its entirety (see Figure 1) is designated by reference character A. The front frame structure is mounted on two carrying heels 22, (one not shown) by means of axle 23 and U shaped bracket 24. Axle 23 is attached at its center to the center of bracket 24 as at 25 whereby the axle may oscillate and permit the wheels to pass over uneven ground without placing a twisting strain on the frame structure. A suitable hitch and vertical pivot are provided whereby the structure may be conveyed from place to place by any suitable means.

It will be observed that wheels 22 are of a diameter which will permit a half turn of axle 23, whereby the hitch may be turned to a position directly under the frame, thus to be out of the way while operating the machine. Bracket 24 is braced to bars 20 and 21 by means of bars 26 and standards 12 are braced to bars 14 and 29 by means of upwardly diverging bars 27.

The bars 20 and 21 are suitably attached to cross members 17 and 18 as illustrated. Member 14 extends a distance in rear of member 17 and a fourth cross member 28 is attached thereto, as illustrated, and extends parallel to member 17 and is attached to members 20, 21, and 15 as illustrated.

Thus it will be seen that I provide a simple, easily manufactured and strong carrying frame, especially adapted to carry the working mechanism of my improved operating device, as will hereinafter appear.

My device comprises a conventional blower fan housing 30 which is positioned between bars 16 and 18 in the usual manner and upon these bars the shaft 31 is journaled as at 32—32. A suitably shaped disk 33 is mounted on shaft 31. A suitable number of blower blades 34 are attached to the periphery of disk 33.

A suitable number of cutter knives 35, preferably four are adjustably mounted on the inside face of disk 33 as clearly indicated in Figures 5 and 6. These knives are supported and held a suitable distance from disk 33 by means of brackets 36. These brackets are provided with a flange 37 for taking the knife thrust and the knife is held to the bracket by means of bolt 38.

The rear base portion of bracket 36 is of considerable width as indicated in Figure 6, and is provided with a curved transverse seat 39. I provide projecting lugs 40 which protrude through openings in the disk 33 far enough to accommodate cotter pins 41.

Thus the bracket 36 will be held from turning out of position after the blade 35 and bolts 38 have been removed. An adjusting screw 42 is screw threaded into disk 33 and locked into position by means of nut 43, the protruding end forming a seat for the front end of bracket 36, which may be rocked on curved seat 39 and the cutting edge of the knife raised or lowered. Thus the knife and bracket will be securely held in the desired position of adjustment by means of bolt 38. No change in this position will take place when the blade 35 and bolt 38 are removed and replaced.

One of the novel features of my invention is the gear shift transmission which provides for three speeds, relative to the disk speed and a neutral, forward, and reverse manual control as follows:

The gear transmission is in its entirety designated by the reference character B and comprises a housing 50 which is attached to and positioned between bars 17 and 18 and bars 15 and 29. A primary shaft 51 is journaled in this housing as indicated. On the outer end of this shaft, I provide a bevel gear 52. A transverse shaft 53 is also journaled in the housing as indicated and is provided with two normally free bevel pinions 54 and 55 which operatively engage gear 52 on the opposite sides thereof.

The inner portion of the hubs of pinions 54 and 55 are provided with jaws or teeth 56. Between these pinions, I mount a throw clutch collar 57 having jaws or teeth 58 which are adapted to operatively engage teeth 56. This collar is slidably splined on shaft 53 in a space sufficiently long to provide a disengaged or neutral position. I provide a groove 59 which is operatively engaged by a shift fork, as will hereinafter appear.

I provide a sprocket 60 on the protruding end of shaft 53. Shaft 31 projects rearwardly and is suitably journaled to member 17 as at 61, the end protruding, upon which another sprocket 62 is mounted. A chain 63 operatively connects sprockets 60 and 62.

A conventional fork and an operating shaft 64 are provided, by means of which the collar 57 may be shifted to thereby engage either pinion, or left in a neutral position, as indicated in Figure 7. The shaft 64 protrudes through the housing at the end of which the usual manual control lever is attached through suitable connecting links.

A secondary shaft 65 is suitably journaled in the housing 50 as indicated and is provided with three gears 66, 67, and 68 of different diameters, each of which is keyed to the shaft 65. On shaft 51, I provide a normally free gear 69 which operatively engages gear 67.

Gears 70 and 71 are provided with a common hub or sleeve 72 which is splined on the shaft, but free to move endwise. A shifting fork 73 engages groove 74 and is made fast to a suitably mounted shaft 75, the end protruding through the housing and having a right angle bend by means of which the operator may manually shift the gears as will hereinafter appear. This shaft 75 is provided with holding notches 76, suitably spaced, into which the locking member 77 passes when in its lowest position as indicated in Figure 9. The shaft 77 has a reduced portion 78, which loosely engages an opening as at 79, the upper end protruding through the housing as at 80, and having a right angle bend, providing a convenient means for manual control. Thus when it is desired to shift the gears the operator lifts member 77, then moves shifter shaft 75, to the desired position and member 77 is again dropped into locking position. Notches 76 are spaced apart whereby the gears may be engaged in the following order; 70 and 69 medium speed, 70 and 68 low speed, 71 and 66 high speed.

As illustrated in Figure 7, the gears are disengaged or in neutral position. Gear 69 is provided with internal teeth which are adapted to engage the teeth of gear 70.

The shaft 31 turns anti-clockwise when viewed from the front, therefore shaft 53 will also turn anti-clockwise. Thus when pinion 54 is engaged shaft 51 will turn clockwise, when viewed from the gear end and this shaft 51 will turn anti-clockwise when pinion 55 is engaged, and if sleeve 72 is then moved to thereby engage gears 70 and 69, shaft 65 will turn clockwise at a medium speed. Shaft 65 will turn at its lowest speed, when gears 70 and 68 are engaged, and when gears 71 and 66 are engaged shaft 65 will obviously turn at its highest speed. Thus I provide three speeds and a reverse.

I will now describe the feeding mechanism and manner of driving same.

Referring specifically to Figure 4, wherein a fraction of the knife carrying disk and an end view of one of the knives is shown the plate 85 acts as a cutter bar, the front edge of which is provided with stripping teeth 86, which lay between the teeth 87 of lower feed roll 88. This roll is journaled in a fixed position on shaft 89.

The top feed roll 90 is also provided with teeth similar to 87. This roll 90 is journaled into suitable bearings 92—92 by means of shaft 93.

Vertical slots 94 are provided in the side walls of the housing whereby roll 90 may raise and fall according to the quantity of material being fed into the knives. In order to always hold this roll 90 parallel to roll 88 a shaft 95 is journaled into the side walls of the housing, the ends protruding. Arms 96—96, are made fast to these ends and the free ends are swivelly connected to links 97, the lower ends of which are suitably connected to bearings 92—92. Thus shaft 95 will permit the roll to move up and down but always parallel to the lower roll. Shaft 95 may be supplied with a spring to thereby force roll 90 down by spring pressure.

I provide a suitable endless apron 98 and a drive shaft 99 having sprockets 100 whereby the apron is suitably propelled. The front end of the apron 98 is adapted to be carried by a sprocketed shaft 101 with suitable bearings and the customary chain adjusting means.

A supplemental roll 105 is carried by shaft 106, the ends of which are journaled in suitable bearings 107—107. Horizontal slots 108 are provided into which shaft 106 is retained by means of rollers, but permitted to move horizontally. Bearings 92 and 107 are connected together by means of links 108—108 which are of a length, when roll 90 is in its lowest position, to hold the supplemental roll in its rear position as shown in Figure 2.

It will be observed that roll 105 is at all times over the apron 98 and that its distance therefrom is fixed. This roll is driven at a peripheral speed which is greater than the speed of apron 98. Thus when an extra quantity of material is fed into the trough, roll 105 will tend to move in an opposite direction to the material and thereby raise roll 90 as indicated by dotted lines in Figure 4, thus to prevent stalk ends or other material from moving over the top thereof. Therefore roll 105 has a dual purpose; first to pack an excessive amount of material and keep it moving forward and second, when necessary to raise the upper feed roll so the material may all move thereunder.

Obviously, since the maximum distance is fixed between supplemental roll and apron 98, this fixed distance will act as a limit to the bulk that may pass to the feed rolls. The top surface of slot 108 is therefore, the limiting factor. It will cause the roll 105 to more firmly press down on the extra material permitted to pass thereunder, more definitely feed the material forward and also, because of its greater speed, cause this roll to move rearwardly, thus raising the feed roll so all of the extra material will pass thereunder. The upper surface of slot 108 is, therefore, the guide and its position is an essential part of applicant's invention. The lower surface of slot 108 is for no purpose except to prevent the roll 105 from contacting the apron.

Shaft 99 is driven by means of a suitable extension from shaft 65. A suitable chain 110 and sprockets 111—111 operatively engage the shafts 89 and 99. Shaft 93 is driven in the opposite direction to shaft 89 in the following manner:

Referring to Figures 7 and 8, it will be seen that when the lowest or highest speed is operating, gear 69 will be turned accordingly, indirectly through gear 67. An idler gear 113 operatively engages gear 69. A shaft 115 is suitably journaled in the housing, the rear end protruding through the housing as at 116. A gear 117 is made fast to shaft 115 and operatively engages gear 113. Thus shaft 115 will turn in the opposite direction to shaft 65 and is adapted to drive the upper feed roll by means of suitable universal joints and a telescoping connecting shaft 118, thus to provide for the vertical movement of upper roll shaft 93.

Thus the upper driving roll and supplemental roll are driven in one direction and the lower feed roll and endless apron shafts are driven in the opposite direction, and all may be made to travel forward or backward and at any one of three speeds relative to the disk speed, thereby providing a choice of three lengths for the ensilage, etc. However I provide simple means by which other speeds and lengths are available, either by reversing the position of sprockets 62 and 60 or by supplying other sprockets. It will be understood that various changes in size and position of parts and of details may be made, without departing from the spirit of my invention and that the various parts cooperate as, and for the purpose specified.

Having thus shown and described my invention I claim:

1. An ensilage cutter, comprising a cutting device, upper and lower feed rolls adapted to feed material to said cutting device, said upper feed roll having guiding means to thereby permit movement away from said lower roll, an endless conveyor adapted to carry and move the material to said feed rolls, a supplemental roll positioned above said conveyor and near the delivery end thereof and having link connections to said upper feed roll, driving means for said supplemental roll whereby its peripheral speed is greater than the traveling speed of said apron, means mounting the supplemental roll for movement only in a direction parallel to the conveyor whereby an excess of material will be unyieldingly compressed on said apron and said supplemental roll will be caused to travel rearwardly and parallel to said conveyor and thereby lift said upper feed roll.

2. An ensilage cutter, comprising a cutting device, upper and lower feed rolls adjacent said cutting device, an endless feed apron adapted to carry and feed the material to said rolls, a supplemental roll having guiding means parallel to said apron and connections to said upper feed roll, driving means for said supplemental roll whereby its peripheral speed is greater than the speed of travel of said apron, said guiding means mounting the supplemental feed roll for movement only in a direction parallel to the conveyor whereby excess material will be unyieldingly compressed on said apron and thereby cause said supplemental roll to move in an opposite direction to the travel of said apron and parallel thereto, means whereby when said supplemental roll moves rearwardly, said upper feed roll will be correspondingly lifted.

3. An ensilage cutter, comprising a cutting device, upper and lower feed rolls adapted to feed material to said cutting device, said upper feed roll having guiding means to thereby permit movement away from said lower feed roll, an endless conveyor adapted to carry and move the material to said feed rolls, a supplemental roll positioned above said conveyor and near the delivery end thereof and having link connections to said upper feed roll, driving means for said supplemental roll whereby its peripheral speed is greater than the traveling speed of said apron, means mounting the supplemental roll for movement only in a direction parallel to the conveyor when contacting an excessive quantity of material whereby the material will be unyieldingly compressed on said apron and said supplemental roll will be caused to travel rearwardly, parallel to said conveyor and thereby lift said upper feed roll.

CHARLES E. EVERETT.